United States Patent
Agyeman et al.

(10) Patent No.: US 11,465,641 B1
(45) Date of Patent: Oct. 11, 2022

(54) INTERFACE SYSTEM FOR CONTROLLING INPUT MECHANISMS OF A VEHICLE

(71) Applicant: EMBARK TRUCKS INC., San Francisco, CA (US)

(72) Inventors: Kwabena Agyeman, San Francisco, CA (US); Ajithkumar Dasari, San Francisco, CA (US); Sami Rajala, San Francisco, CA (US)

(73) Assignee: EMBARK TRUCKS INC., San Francisco, CA (US)

( * ) Notice: Subject to any disclaimer, the term of this patent is extended or adjusted under 35 U.S.C. 154(b) by 0 days.

(21) Appl. No.: 17/704,197

(22) Filed: Mar. 25, 2022

Related U.S. Application Data

(63) Continuation of application No. 17/457,946, filed on Dec. 7, 2021.

(51) Int. Cl.
  *B60W 50/10* (2012.01)
  *B60W 60/00* (2020.01)
  *H04L 12/40* (2006.01)

(52) U.S. Cl.
  CPC ........ *B60W 50/10* (2013.01); *B60W 60/0051* (2020.02); *H04L 12/40* (2013.01); *H04L 2012/40215* (2013.01)

(58) Field of Classification Search
  CPC .... B60W 50/10; B60W 60/0051; H04L 12/40
  See application file for complete search history.

(56) References Cited

U.S. PATENT DOCUMENTS

| | | | | |
|---|---|---|---|---|
| 5,803,043 A | * | 9/1998 | Bayron | .......... F02P 9/005 701/115 |
| 2017/0277182 A1 | * | 9/2017 | May | .......... B60W 50/082 |

OTHER PUBLICATIONS

"I took a ride in Waymo's fully driverless car", The Verge Youtube Channel, published Dec. 9, 2019, retrieved from https://www.youtube.com/watch?v=_EoOvVkEMo (Year: 2019).*

"Yamaha Disklavier ENSPIRE Product Demo | Piano Gallery Utah", Piano Gallery Youtube Channel, published Apr. 9, 2018, retrieved from https://www.youtube.com/watch?v=sxl0PIPZjBQ (Year: 2018).*

* cited by examiner

*Primary Examiner* — Calvin Cheung
(74) *Attorney, Agent, or Firm* — Buckley, Maschoff & Talwalkar LLC

(57) ABSTRACT

Provided is a system and method for interfacing with physical input mechanisms of a vehicle and electrically controlling signals from the physical input mechanisms to a computer of the vehicle. Examples of such physical input mechanisms include a gas pedal, a brake pedal, a turn signal stalk, a button, and the like. In one example, the method may include receiving, via a first interface, a request to actuate a component of a vehicle that is controlled by a physical input mechanism, generating, via a processor, a control signal that corresponds to an actuation signal from the physical input mechanism, and transmitting, via a second interface, the generated control signal to a control unit of the vehicle for actuating the component of the vehicle.

17 Claims, 10 Drawing Sheets

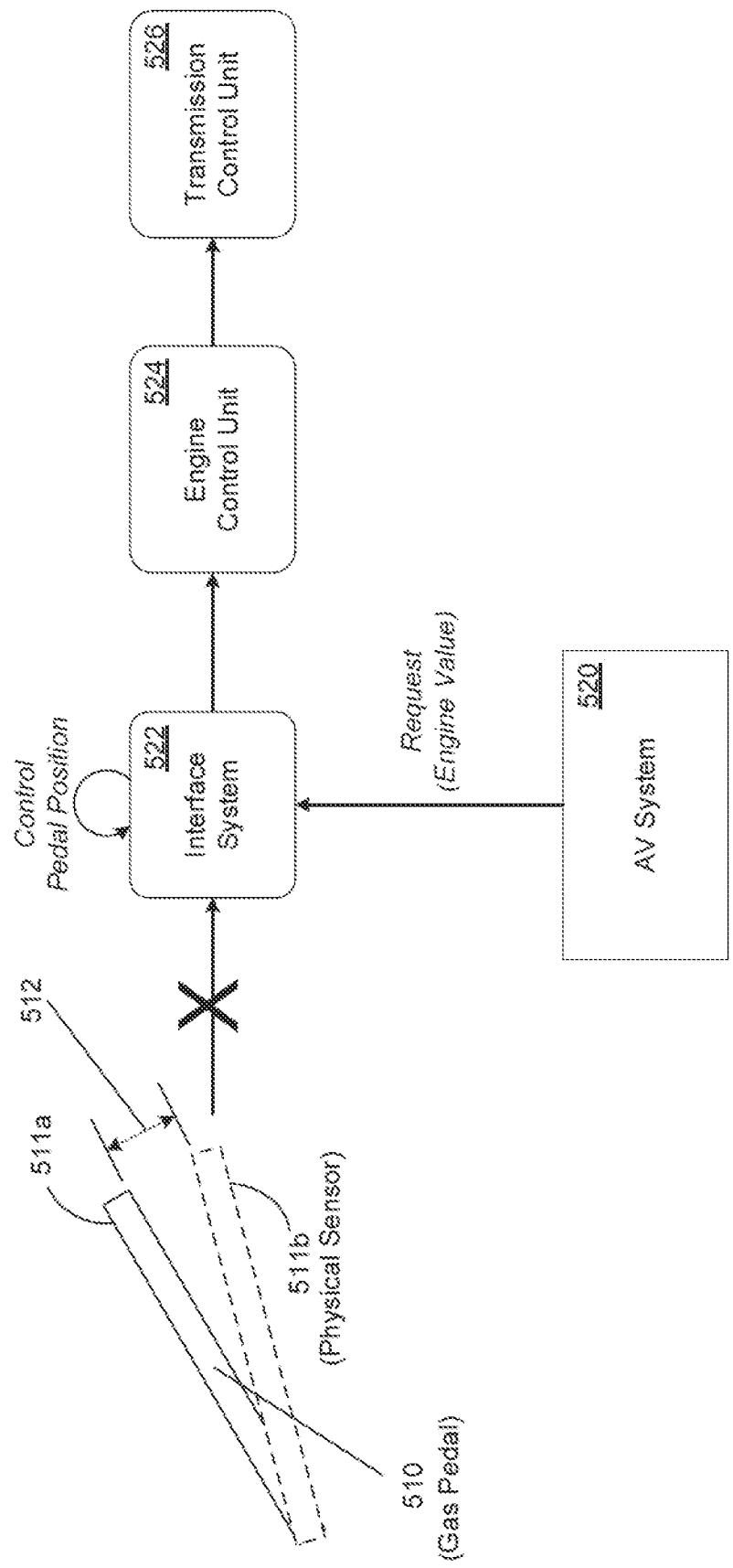

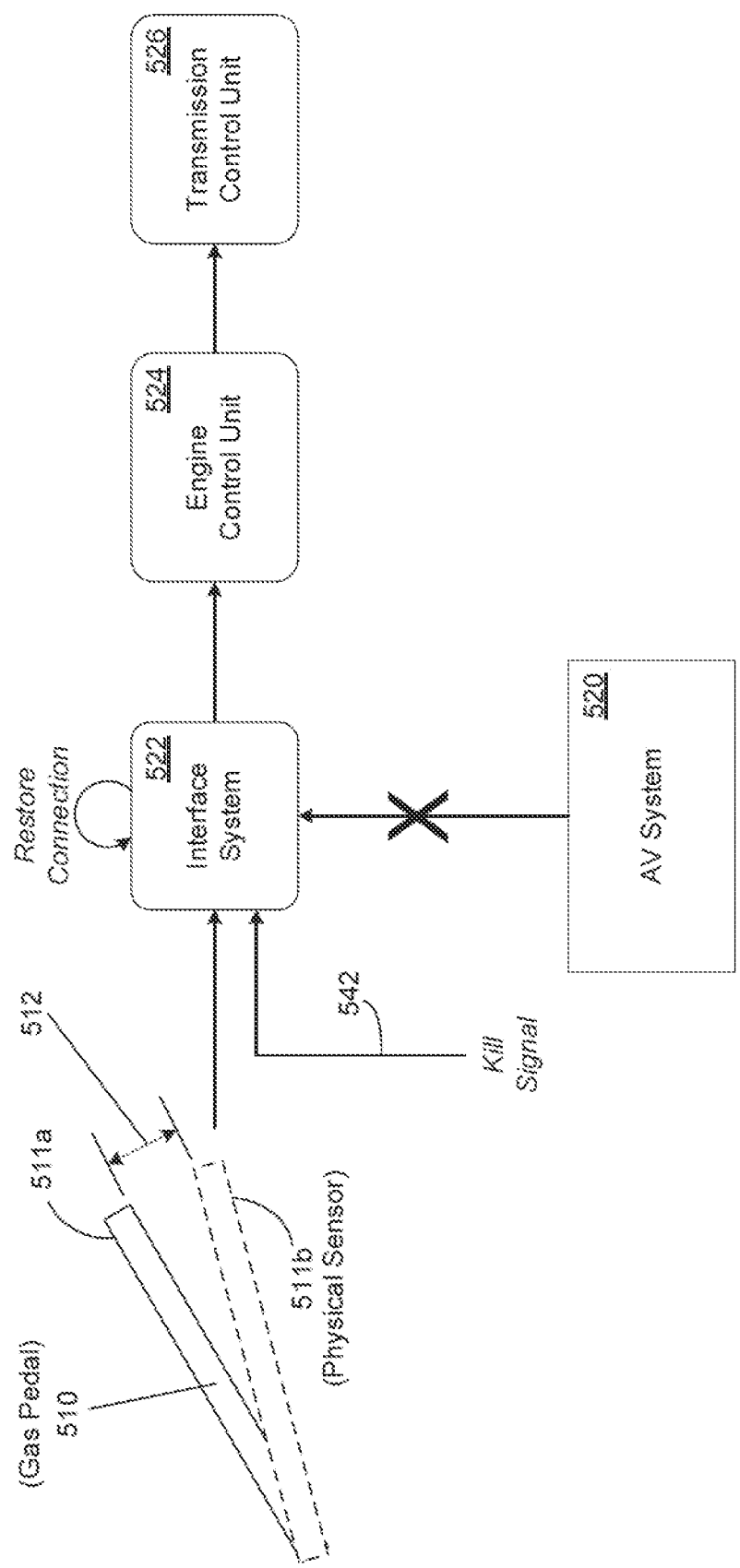

INTERFACE SYSTEM FOR CONTROLLING INPUT MECHANISMS OF A VEHICLE

CROSS-REFERENCE TO RELATED APPLICATIONS

The present application is a continuation of U.S. patent application Ser. No. 17/457,946, filed on Dec. 7, 2021, in the United States Patent and Trademark Office, the entire disclosure of which is incorporated herein by reference for all purposes.

BACKGROUND

When a user presses on the gas pedal of a vehicle, a sensor captures the pedal position and sends the captured pedal position to an engine control unit which modulates the engine output of the vehicle based on the pedal position. For example, the engine control unit may determine an amount of torque and apply the amount of torque to the engine. Furthermore, a transmission control unit receives the pedal position and automatically adjusts gear settings of the vehicle based on the pedal position.

Meanwhile, an autonomous vehicle does not physically depress a gas pedal (or a brake pedal) to cause the vehicle to move (or stop). Instead, the autonomous vehicle's computer sends an instruction to the engine control unit which controls the output of the engine. For example, the instruction may identify a desired torque for the vehicle and the engine control unit may increase the output of the engine until the desired torque is achieved.

In response, the transmission control unit of the autonomous vehicle automatically changes gears in an attempt to match the output of the engine. However, transmission control units in the prior art are optimized to set gearing based on pedal position, which is not provided by a computer instruction directly to the engine. Consequently, the transmission control unit attempts to find the correct gear reactively through a tuning process. Eventually the transmission control unit may find the correct gear, but there can be significant delays resulting in inefficiencies and undesirable roadgoing behavior. Furthermore, in certain situations, such as a highly loaded environment, e.g. if the vehicle is going up a hill, the tuning process may be very difficult to achieve. Accordingly, what is needed is a better way for an autonomous vehicle to control physical input mechanisms of a vehicle, such as a gas pedal, a brake pedal, and the like.

The example embodiments are directed to a universal interface (also referred to herein as an interface system, etc.) that can be used to imitate or otherwise mimic signals from various physical input mechanisms of a vehicle which can be used to control other components of the vehicle. The physical input mechanisms may include a gas pedal, a brake pedal, a turn-signal stalk, a button on the dashboard, steering wheel, console, etc.) The system described herein may create and output signals that mimic or otherwise imitate signals from the physical input mechanisms. These control signals can be used to control the corresponding physical components of the vehicle that the physical input mechanism typically control. Therefore, the system disclosed herein improves upon the state of the art by providing improved control signaling to a vehicle thereby improving vehicle response.

For example, the system may generate a signal that imitates a reading from a gas pedal sensor, a brake pedal sensor, a turn signal stalk sensor (e.g., pull up, pull down, turn dial, etc.), and the like. In some embodiments, the system may include interfaces (e.g., mounting harnesses) for easily connecting to wiring harnesses of various components of the vehicle such as the gas pedal, the brake pedal, the turn signal stalk, the engine control unit, a controller area network (CAN) bus, and the like.

The system may also include an interface for attaching to a wiring harness of the vehicle's computer enabling the vehicle's computer to send instructions/requests for controlling physical input mechanisms of the vehicle to the system. For example, the vehicle's computer may request actuation of the gas pedal by sending a torque value to the system. In response, the system may translate the torque value into a pedal position value (e.g., an amount in which the pedal is moved) of the gas pedal in the physical world, and transmit the pedal position value to the engine control unit. In this example, the system may query a table with the torque value and receive the corresponding pedal position value. If the table does not include an exact match for the torque/pedal position value, the system may perform an interpolation process to interpolate a pedal position value for the requested the torque value based on a similar torque value and its mapped pedal position. Other mechanisms to associate a physical position or input to a control signal are known in the art and covered by the invention disclosed herein.

In the example embodiments, the engine control unit receives the pedal position signal from the system. Here, the engine control unit is unaware of whether the signal is coming from the actual gas pedal sensor or from the system. In response, the engine control unit controls the output of the engine based on the pedal position value in the signal. Likewise, the transmission control unit is capable of finding the proper gear almost immediately based on the pedal position value. The process can significantly decrease the amount of time it takes for a vehicle to reach the desired torque in the correct gear in comparison to the traditional tuning process performed based on the computer instruction alone. Furthermore, if necessary, a "kill" switch to interrupt the computerized control operations can be provided that returns full control of the gas pedal (or other physical input mechanism) to its original configuration. In response to the kill signal, the system may disable a connection between the system and the engine control unit and restore a connection between the gas pedal sensor and the engine control unit.

Furthermore, the system may be used to generate electrical input signals that mimic or otherwise imitate signals of other physical input components of the vehicle such as a brake pedal, a headlight button, a turn signal stalk, and the like. Here, the system may include multiple interfaces for simultaneously connecting to multiple physical input components. Furthermore, the system may generate input signals for each of the physical input components.

In addition, different manufacturers (also referred to herein as OEMs) have different control signals, messages, formats, etc. between the physical input mechanisms and the components of the vehicle. The system described herein is "universal" because it provides ports/interfaces and logic that can be used on a vehicle of any type of manufacturer. For example, the system may be programmed with different logic and instructions for each of the different manufacturers. As another example, the system may be dynamically configured for a particular manufacturer. In this case, the system may be designed to work with a particular OEM ahead of time by swapping out a replaceable part on a motherboard of the system.

According to an aspect of an example embodiment, provided is an apparatus that may include a processor, and one or more interfaces configured to electrically connect the processor to a physical input mechanism of a vehicle that controls a component of the vehicle, a control unit, and a vehicle computer, wherein the processor may be configured to receive a request to actuate the component of the vehicle that is controlled by the physical input mechanism, generate a control signal that corresponds to an actuation signal from the physical input mechanism, and transmit the generated control signal to the control unit of the vehicle for actuating the component of the vehicle.

According to an aspect of another example embodiment, provided is a method that may include receiving, via a first interface, a request to actuate a component of a vehicle that is controlled by a physical input mechanism, generating, via a processor, a control signal that corresponds to an actuation signal from the physical input mechanism, and transmitting, via a second interface, the generated control signal to a control unit of the vehicle for actuating the component of the vehicle.

According to an aspect of another example embodiment, provided is a non-transitory computer-readable medium with instructions which when executed by a processor cause a computer to perform a method that may include receiving, via a first interface, a request to actuate a component of a vehicle that is controlled by a physical input mechanism, generating, via a processor, a control signal that corresponds to an actuation signal from the physical input mechanism, and transmitting, via a second interface, the generated control signal to a control unit of the vehicle for actuating the component of the vehicle.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIGS. 5A-5C are diagrams illustrating a process of controlling a physical input on a component of a vehicle in accordance with an example embodiment.

Figure 1:
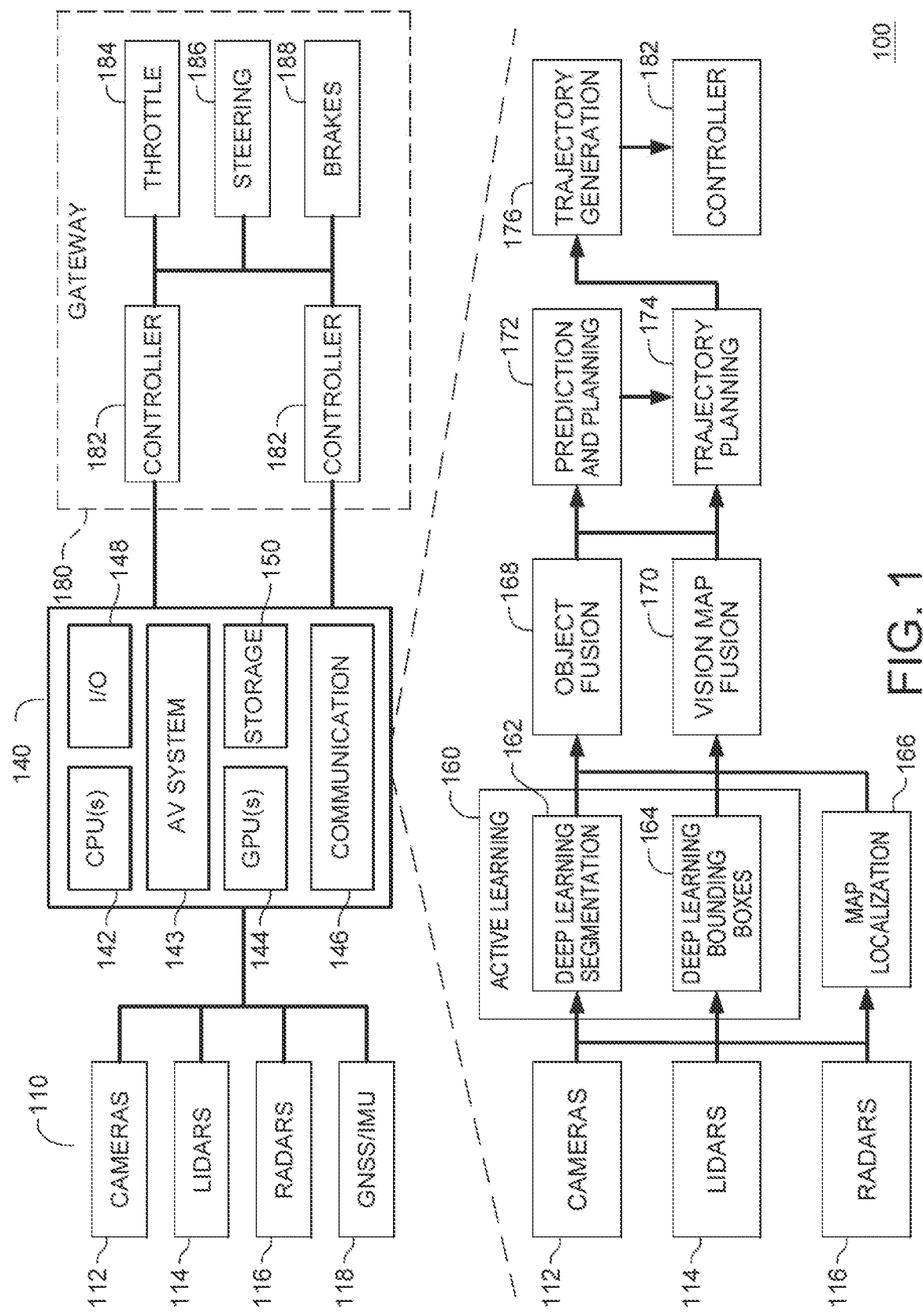
FIG. 1 is a diagram illustrating a control system that may be deployed in a vehicle such as the semi-truck depicted in FIGS. 2A-2C, in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

For convenience and ease of exposition, a number of terms will be used herein. For example, the term "semi-truck" will be used to refer to a vehicle in which systems of the example embodiments may be used. The terms "semi-truck", "truck", "tractor", "vehicle" and "semi" may be used interchangeably herein.

Light detection and ranging (lidar) sensors are used by vehicles to measure a surrounding area by obtaining a sparse point cloud using distances to points in the point cloud that are measured by light beams from the lidar sensors. The illumination works independently from ambient light and can be used in any conditions. Furthermore, the lidar sensors can capture data that can be used to generate a map of the world in three-dimensions (3D). Meanwhile, vehicle cameras can capture images (e.g., RGB images, black and white images, etc.) of the world around the vehicle and provide complimentary data to the lidar data captured by the lidar sensors. For example, cameras can capture data such as color, texture, appearance, etc., while lidar is able to capture and model structural aspects of the data.

In many vehicles, the perception of the vehicle is created based on a combination (i.e., jointly) of lidar data from the lidar sensors and image data captured by the cameras. For accurate perception, these two systems must be aligned with respect to each other. Calibration can be performed to align a coordinate frame of a lidar sensor(s) with a coordinate frame of a camera by changing extrinsic parameters such as rotation and translation between the coordinate frames of the lidar sensor and the camera. These extrinsic parameters can be used to fuse information together from the lidar sensors and the image sensors when visualizing the vehicle interprets visual data from the road.

With the calibrated sensors, the vehicle can capture images and lidar readings of the area surrounding the vehicle and build/modify a three-dimensional map that is stored internally within a computer of the vehicle (or remotely via a web server). The vehicle can localize itself within the map and make decisions on how to steer, turn, slow down, etc. based on other objects, lane lines, entrance lanes, exit lanes, etc. within the map. Autonomous vehicles may use one or more computer systems to control the vehicle to move autonomously without user input. For example, the vehicle may be equipped with an autonomous vehicle (AV) system that generates signals for controlling the engine, the steering wheel, the brakes, and the like, based on other objects, lane lines, entrance lanes, and exit lanes, within the map.

However, many features of a vehicle are still be operated (in some cases solely) by a user inputting commands (physical actions) on physical input mechanisms of the vehicle using their hands, feet, etc. For example, headlights, gas pedals, brake pedals, turn signals, input buttons, and the like, are examples of physical input mechanisms that can be used to control parts of the vehicle. For example, a user may use their hand to turn a stalk next to the steering wheel to turn on the headlights or actuate a turn signal. As another example, a human may use their foot to press on a gas pedal to cause the engine to speed-up, and likewise use their foot to press on a brake pedal to cause the braking system to be applied and the vehicle's wheels to slow down.

The example embodiments are directed to an interfacing system (interface system) that can generate control signals for these physical input mechanisms that mimic or otherwise imitate the actuation signals created by the physical input mechanisms, and thereby electrically control the corresponding physical components of the vehicle based on instructions from the vehicle's computer rather than a user physically inputting commands inside the vehicle. The system may be referred to herein as an interface system, a universal interface, or the like. The system may comprise a housing that holds a motherboard, circuit components (e.g., processor, resistor module, etc.) installed therein, and the like. Furthermore, the motherboard may comprise interfaces that enable the system to physically connect to various components of the vehicle. For example, the interfaces may include, but are not limited to, mounting harnesses, ports, cables, etc. or other attachment means for receiving and connecting to wires (e.g., wire harnesses) of other components of the vehicle. For example, the system may be electrically connected/attached into the wiring of the vehicle (e.g., to a wire harness of the physical input mechanism and to a wire harness of a control unit for controlling the corresponding physical component).

According to various embodiments, the system may disable or otherwise block a signal from the physical input mechanism from being used to control/actuate the physical input mechanism and instead replace the signal from the physical input mechanism with a signal from the control signal that is triggered by the vehicle's computer. For example, the system may be connected to the vehicle's AV system which may be integrated within the vehicle's computer and which can send requests or instructions to the system to cause the system to imitate a physical input by a user on a physical input mechanism of a vehicle component.

In some of the examples herein, the vehicle is illustrated as a semi-truck. However, it should be appreciated that the example embodiments are applicable to any kind of autonomous vehicle and not just trucks or semi-trucks but instead may include cars, boats, tractors, motorcycles, and the like, as well as trucks of all kinds.

Figure 2A:
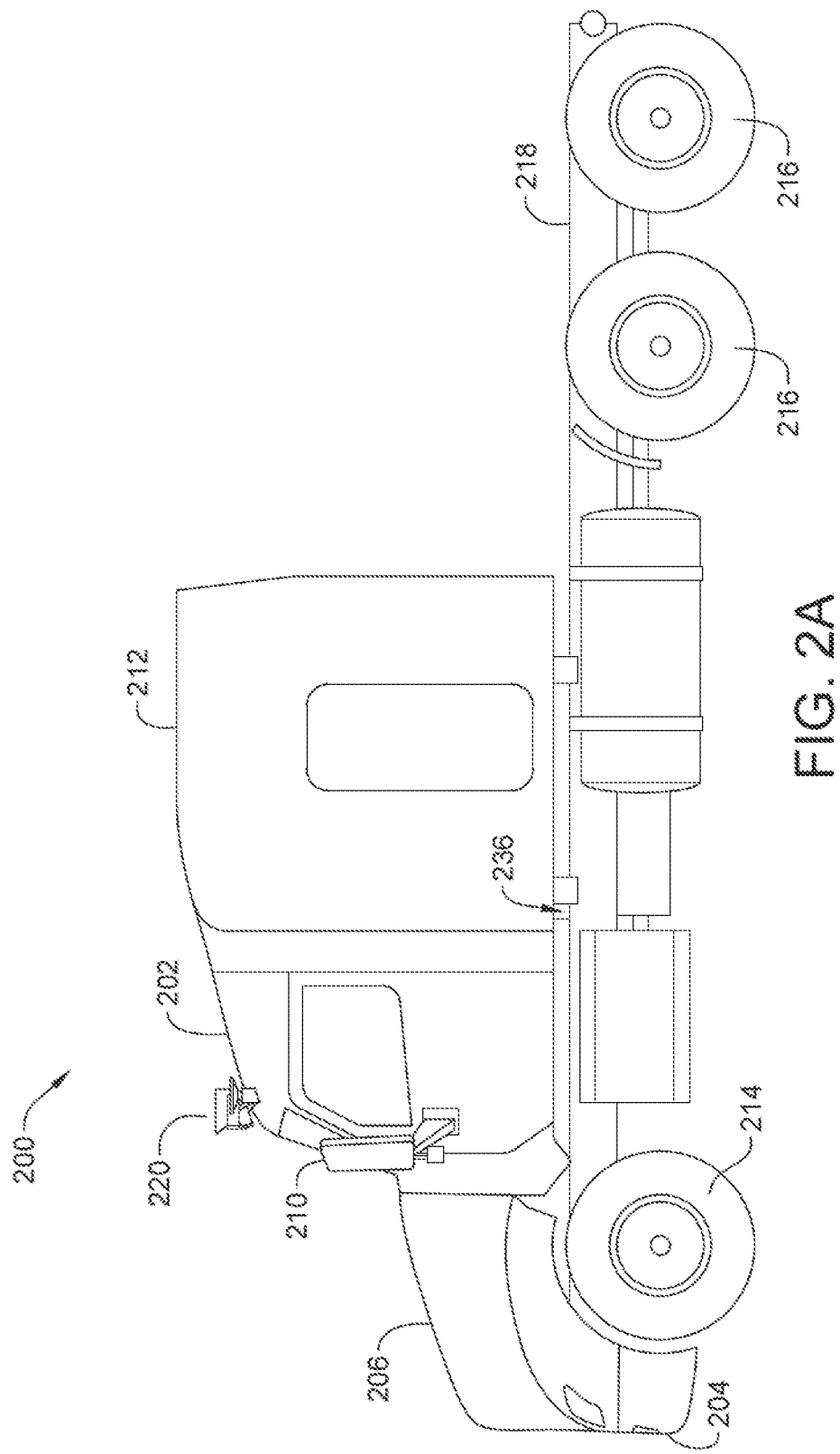
FIGS. 2A-2C are diagrams illustrating exterior views of a semi-truck that may be used in accordance with example embodiments.
Figure 2B:
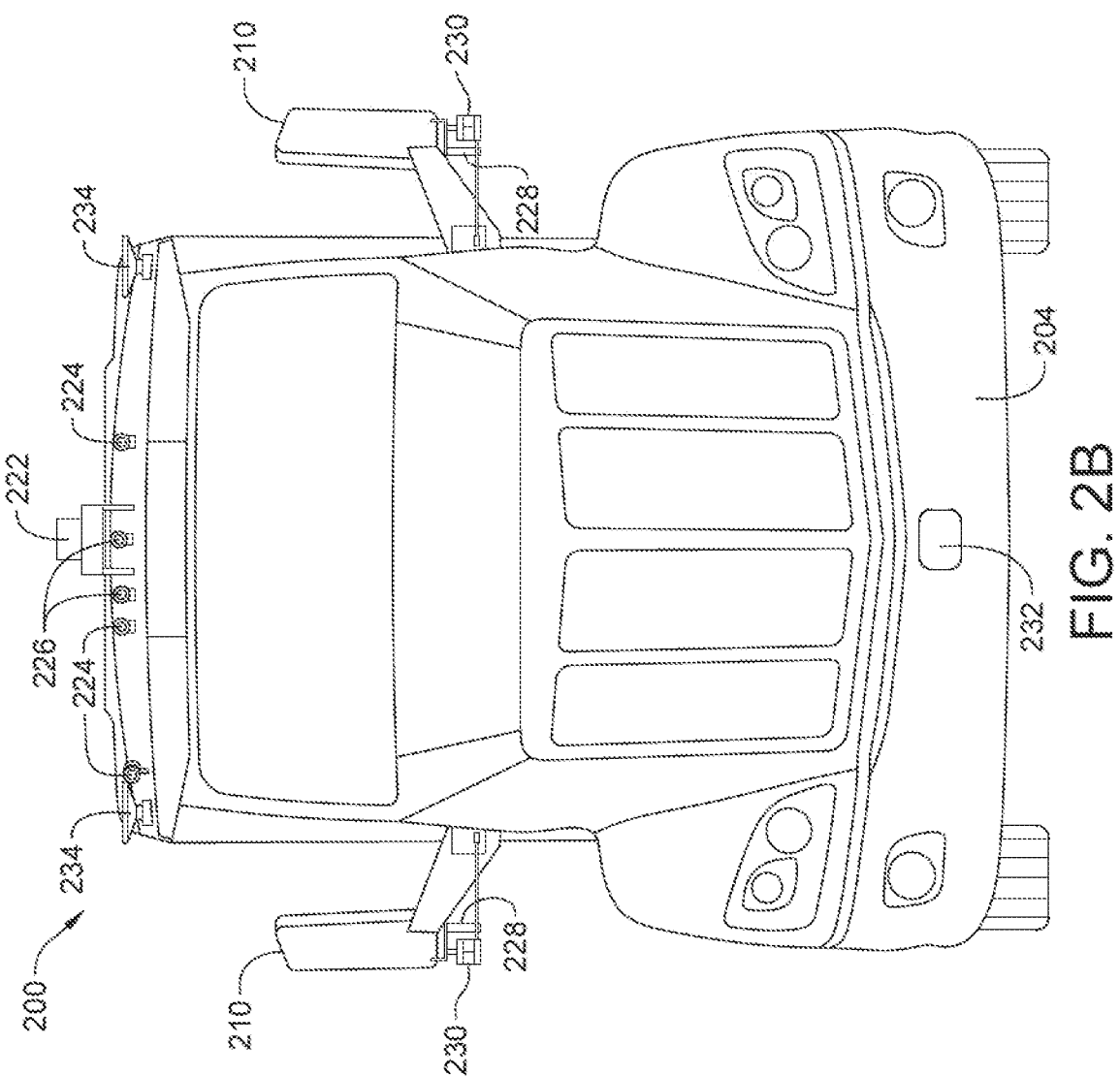
Figure 2C:
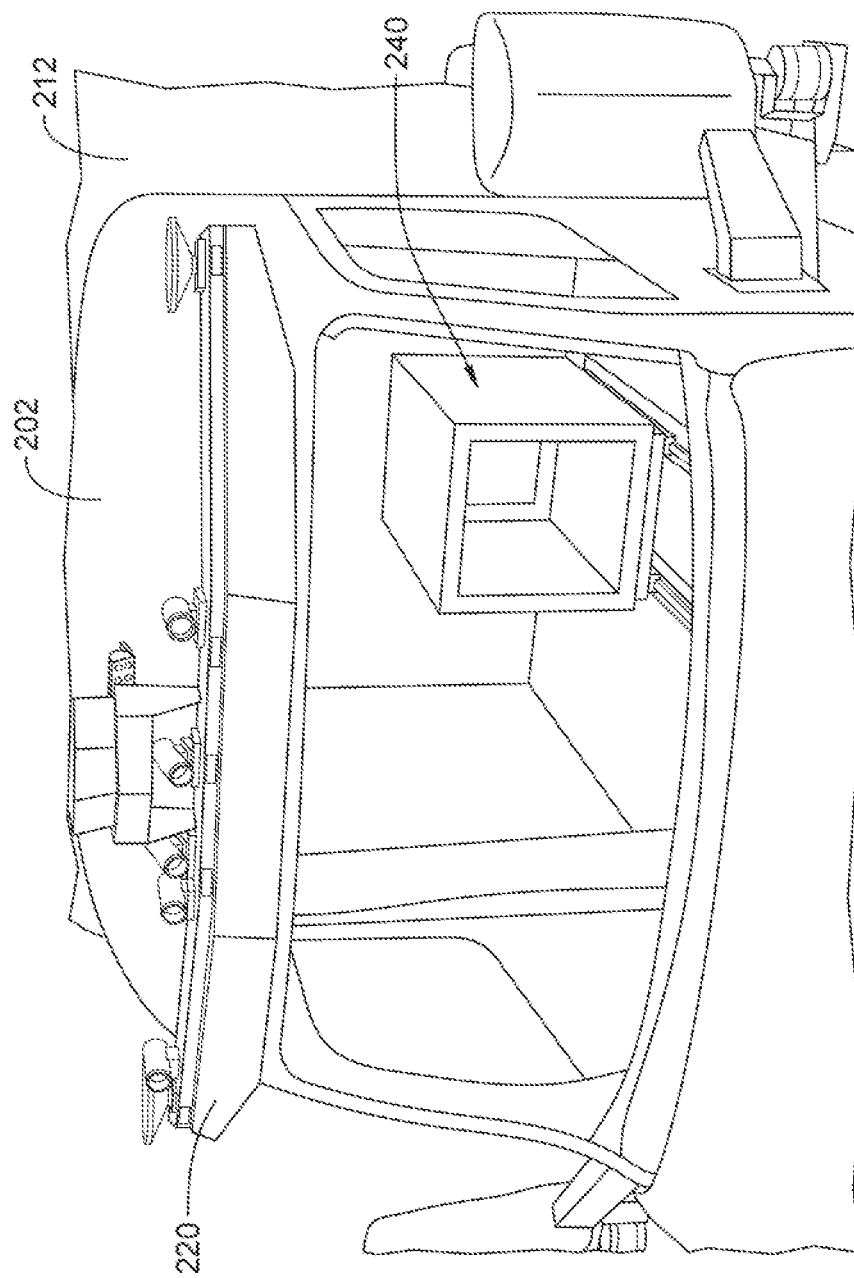

FIG. 1 illustrates a control system 100 that may be deployed in a vehicle such as the semi-truck 200 depicted in FIGS. 2A-2C, in accordance with an example embodiment. Referring to FIG. 1, the control system 100 may include a number of sensors 110 which collect data and information provided to a computer system 140 to perform operations including, for example, control operations which control components of the vehicle via a gateway 180. Pursuant to some embodiments, the gateway 180 is configured to allow the computer system 140 to control a number of different components from different manufacturers.

The computer system 140 may be configured with one or more central processing units (CPUs) 142 to perform processing including processing to implement features of embodiments of the present invention as described elsewhere herein as well as to receive sensor data from sensors 110 for use in generating control signals to control one or more actuators or other controllers associated with systems of the vehicle (including, for example, actuators or controllers allowing control of a throttle 184, steering systems 186, brakes 188 or the like). In general, the control system 100 may be configured to operate the semi-truck 00 in an autonomous (or semi-autonomous) mode of operation. In some embodiments, the computer system 140 may include an AV system 143 for controlling the system that is further described herein with respect to FIGS. 3, 4, 5A-5C, and 6. For example, the AV system 143 may be installed within the computer system 140.

In operation, the control system 100 may be operated to capture images from one or more cameras 112 mounted on various locations of the semi-truck 200 and perform processing (such as image processing) on those images to identify objects proximate or in a path of the semi-truck 200. Further, lidar 114 and radar 116 sensors may be positioned to sense or detect the presence and volume of objects proximate or in the path of the semi-truck 200. Other sensors may also be positioned or mounted on various locations of the semi-truck 200 to capture other information such as position data. For example, the sensors may include one or more satellite positioning sensors and/or inertial navigation systems such as GNSS/IMU 118. A Global Navigation Satellite System (GNSS) is a space-based system of satellites that provide the location information (longitude, latitude, altitude) and time information in all weather conditions, anywhere on or near the Earth to devices called GNSS receivers. GPS is the world's most used GNSS system. An inertial measurement unit ("IMU") is an inertial navigation system. In general, an inertial navigation system ("INS") measures and integrates orientation, position, velocities, and accelerations of a moving object. An INS integrates the measured data, where a GNSS is used as a correction to the integration error of the INS orientation calculation. Any number of different types of GNSS/IMU 118 sensors may be used in conjunction with features of the present invention. The data collected by each of these sensors may be processed by the computer system 140 to generate control signals that control the operation of the semi-truck 200. The images and location information may be processed to identify or detect objects around or in the path of the semi-truck 200 and control signals may be emitted to adjust the throttle 184, steering 186 or brakes 188 as needed to safely operate the semi-truck 200. While illustrative example sensors and actuators or vehicle systems are shown in FIG. 1, those skilled in the art, upon reading the present disclosure, will appreciate that other sensors, actuators or systems may also be used. For example, in some embodiments, actuators to allow control of the transmission of the semi-truck 200 may also be provided.

The control system 100 may include a computer system 140 (such as a computer server) which is configured to provide a computing environment in which one or more software or control applications (such as items 160-182) may be executed to perform the processing described herein. In some embodiments, the computer system 140 includes components which are deployed on a semi-truck 200 (e.g., they may be deployed in a systems rack 240 positioned within a sleeper compartment 212 as shown in FIG. 2C). The computer system 140 may be in communication with other computer systems (not shown) that may be remote from the semi-truck 200 (e.g., the computer systems may be in communication via a network connection).

In some examples, the computer system 140 may be implemented as a server. Furthermore, the computer system 140 may configured using any of a number of well-known computing systems, environments, and/or configurations such as, but not limited to, personal computer systems, cloud platforms, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, and the like, which may include any of the above systems or devices, and the like.

A number of different software applications or components may be executed by the computer system 140 and the control system 100. For example, as shown, applications may be provided which perform active learning machine processing (active learning component 160) to process images captured by one or more cameras 112 and information obtained by lidar 114. For example, image data may be processed using deep learning segmentation models 162 to identify objects of interest in those images (such as, for example, other vehicles, construction signs, etc.). Lidar data may be processed by the machine learning applications 164 to draw or identify bounding boxes on image data to identify objects of interest located by the lidar sensors. Information output from the machine learning applications may be provided as inputs to object fusion 168 and vision map fusion 170 software components which may perform processing to predict the actions of other road users and to fuse local vehicle poses with global map geometry in real-time, enabling on-the-fly map corrections. The outputs from the machine learning applications may be supplemented with information from Radars 116 and map localization 166 application data (as well as with positioning data). These applications allow the control system 100 to be less map reliant and more capable of handling a constantly changing road environment. Further, by correcting any map errors on the fly, the control system 100 can facilitate safer, more scalable and more efficient operations as compared to alternative map-centric approaches. Information is provided to prediction and planning application 172 which provides input to trajectory planning 174 components allowing a trajectory 176 to be generated in real time based on interactions and predicted interactions between the semi-truck 200 and other relevant vehicles in the environment. In some embodiments, for example, the control system 100 generates a sixty second planning horizon, analyzing relevant actors and available trajectories. The plan that best fits multiple criteria (including safety, comfort and route preferences) is selected and any relevant control inputs needed to implement the plan are provided to controllers 182 to control the movement of the semi-truck 200.

These applications or components (as well as other components or flows described herein) may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative, the processor and the storage medium may reside as discrete components. For example, FIG. 1 illustrates an example computer system 140 which may represent or be integrated in any of the above-described components, etc. FIG. 1 is not intended to suggest any limitation as to the scope of use or functionality of embodiments of the application described herein. The computer system 140 is capable of being implemented and/or performing any of the functionality set forth hereinabove.

The computer system 140 may be described in the general context of computer system-executable instructions, such as program modules, being executed by a computer system. Generally, program modules may include routines, programs, objects, components, logic, data structures, and so on that perform particular tasks or implement particular abstract data types. The computer system 140 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 140 is shown in the form of a general-purpose computing device. The components of the computer system 140 may include, but are not limited to, one or more processors (such as CPUs 142 and GPUs 144), a communication interface 146, one or more input/output interfaces 148 and the storage device 216. Although not shown, the computer system 140 may also include a system bus that couples various system components including system memory to the CPUs 142. In some embodiments, the input/output interfaces 148 may also include a network interface. For example, in some embodiments, some or all of the components of the control system 100 may be in communication via a controller area network ("CAN") bus or the like.

The storage device 150 may include a variety of types and forms of computer readable media. Such media may be any available media that is accessible by computer system/server, and it may include both volatile and non-volatile media, removable and non-removable media. System memory, in one embodiment, implements the flow diagrams of the other figures. The system memory can include computer system readable media in the form of volatile memory, such as random access memory (RAM) and/or cache memory. As another example, storage device 150 can read and write to a non-removable, non-volatile magnetic media (not shown and typically called a "hard drive"). Although not shown, the storage device 150 may include one or more removable non-volatile disk drives such as magnetic, tape or optical disk drives. In such instances, each can be connected to the bus by one or more data media interfaces. Storage device 150 may include at least one program product having a set (e.g., at least one) of program modules that are configured to carry out the functions of various embodiments of the application.

FIGS. 2A-2C are diagrams illustrating exterior views of a semi-truck 200 that may be used in accordance with example embodiments. Referring to FIGS. 2A-2C, the semi-truck 200 is shown for illustrative purposes only—those skilled in the art, upon reading the present disclosure, will appreciate that embodiments may be used in conjunction with a number of different types of vehicles. The example semi-truck 200 shown in FIGS. 2A-2C is one configured in a common North American style which has an engine 206 forward of a cab 202, a steering axle 214 and drive axles 216. A trailer (not shown) is attached to the semi-truck 200 via a fifth-wheel trailer coupling that is provided on a frame 218 positioned over the drive axles 216. A sleeper compartment 212 is positioned behind the cab 202. A number of sensors are positioned on different locations of the semi-truck 200. For example, sensors may be mounted on a roof of the cab 202 on a sensor rack 220. Sensors may also be mounted on side mirrors 210 as well as other locations. As will be discussed, sensors may be mounted on the bumper 204 as well as on the side of the cab 202 or other locations. For example, a rear facing radar 236 is shown as mounted on a side of the cab 202 in FIG. 2A. Embodiments may be used with other configurations of trucks or other vehicles (e.g., such as semi-trucks having a cab over or cab forward configuration or the like). In general, and without limiting embodiments of the present invention, features of the present invention may be used with desirable results in vehicles that carry cargo over long distances, such as long-haul semi-truck routes.

FIG. 2B is a front view of the semi-truck 200 and illustrates a number of sensors and sensor locations. The sensor rack 220 may secure and position several sensors including a long range lidar 222, long range cameras 224, GPS antennas 234, and mid-range front facing cameras 226. The side mirrors 210 may provide mounting locations for rear-facing cameras 228 and mid-range lidar 230. A front radar 232 may be mounted on the bumper 204. Other sensors may be mounted or installed on other locations—the locations and mounts depicted in FIGS. 2A-2C are for illustrative purposes only. Referring now to FIG. 2C, a partial view of the semi-truck 200 is shown which shows an interior of the cab 202 and the sleeper compartment 212. In some embodiments, portions of the control system 100 of FIG. 1 are deployed in a systems rack 240 in the sleeper compartment 212, allowing easy access to components of the control system 100 for maintenance and operation.

The example embodiments are directed to a new piece of technology that has never been created before. The interface system described herein is a hardware system (e.g., a box or other piece of equipment) with a motherboard and various parts embedded therein including adapters (e.g., ports, mounting harness, slots, etc.) for electrically connecting with various mechanical equipment of a vehicle and a processor for controlling the signaling of the system. The system enables a vehicle's computer (e.g., the AV system) to have electronic control over systems that the AV system is not designed to have electronic control over from a third party system.

Despite advancements in autonomous vehicle technology, many aspects of a vehicle are still designed to be controlled by a human (i.e., a human touch or otherwise physically contacting and manipulating physical input mechanisms). For example, a gas pedal or a brake pedal is meant to be depressed by a person using their foot to press on the pedals. Likewise, a stalk for turn signals is meant to be pulled up or down or have dials turned by a hand of a user. Likewise, input buttons such as for cruise control, air conditioning, user interface inputs, hazard lights, etc. are all designed to be manipulated by a user making physical contact with their hand on some sort of physical input mechanism.

The interface system described herein provides the ability for a vehicle's AV system to turn off and on the systems of the vehicle as if a driver were controlling them. The system also allows the vehicle's computer to perform the behavior of a driver within the vehicle so that the vehicle cannot tell if a human or a computer is operating the vehicle. It gives the ability for the electronics system of an autonomous vehicle (AV) to control the vehicle like a human.

The interface system may be physically attached (e.g., using cables, wires, wire harnesses, input ports, mounting harnesses, etc.) to various pieces of equipment/parts of the vehicle such as a brake pedal (and its sensors), a gas pedal (and its sensors), a stalk on the steering wheel (and its sensors), and the like. Once attached to the various components, the interface system may be attached under the console of the vehicle where it is hidden from sight. The system can be adapted to fit in all types of vehicles and is therefore considered a "universal" interface or universal system because it can interface with all types of OEMs including PETERBILT®, NAVISTAR®, VOLVO®, DAIMLER®, and the like. These are the four major OEMs that serve the semi-truck market in the US, but it should be appreciated that the system may work with all vehicles and all OEMs, not just semitrucks. This is helpful achieve a universal interface. Furthermore, the system may adapt to a vertical controller area network (CAN) architecture of a vehicle making it compatible. Therefore, the software of the system may be configured with CAN architecture features.

As an example, when moving the vehicle autonomously, the AV system interacts with an engine control unit to output the engine and a transmission control unit which changes gears. Traditionally, the AV system of the vehicle provides a torque value to an engine control unit. In response, the engine control unit adjusts a output rate of the engine based on the torque value. However, the transmission control unit is not designed to simply select a gear based on torque because other factors are needed such as gear ratio, pedal position, RPM, etc. Therefore, what usually happens is the transmission control unit goes through a tuning process where it guesses the best gear and continues to adjust the gears until the best gear is found to meet the requested torque. This process can take significant time. Furthermore, if the vehicle is going up a hill or performing other actions which cause a strain on the vehicle's movement, the tuning process can take even longer.

In the example embodiments, the interface system can translate values provided the vehicle computer (e.g., such as a torque value, a RPM value, and the like) into a pedal position value (e.g., a sensor reading output) that identifies an actual pedal position of the gas pedal as if the gas pedal were being pressed on by the foot of a driver. The system may store or otherwise access a table (e.g., a lookup table, etc.) which includes mappings of pedal position to torque values and/or RPM values. The table does not need every single possible combination of torque value, RPM value, and corresponding pedal position value. Instead, the system may interpolate torque values, RPM values, and pedal position values based on other known torque values, RPM values, and pedal position values stored in the table using a sparse map. Essentially, the system determines a pedal position value (e.g., a distance of movement/depression of the pedal) to achieve such torque at such an RPM. In response, the engine control unit and the transmission control unit can figure out the speed and the gear, almost immediately. Here, the engine control unit can use the torque value, the RPM value, and/or the pedal position value. Likewise, the transmission control unit can use the pedal position value. This process greatly reduces the traditional tuning process.

Every OEM does the same thing but may use different connectors and different communication protocols. In other words, every OEM essentially does the same pulse width modulation (PWM) control with the engine, they just change the voltage levels between PWM and analog values, and they change the connector. Here, the interface system can attach directly to the wires of the engine control unit and the AV system, and the system has a flexible input system that can handle any of these signals. For example, different resistors on a motherboard of the system may be used for the different OEMs (truck types). In this case, the board can be configured to use one of these resistors depending on the type of truck that the system is attached to. Furthermore, extra jumpers may be used to change the CAN bus feed and turn on and off CAN routing features. For the trucking industry, the system can be designed with four different versions of the same board with four different modifiable resistor modules for the four major OEMs. The interface system may receive CAN commands and apply a translation to the command to generate a signal to control a component of a vehicle such as an actuator, control unit, etc., and send the signal to the component. Furthermore, the interface system may receive a report back from the component acknowledge performance of the command. Here, the interface system can provide this report to other components of the vehicle, such as the vehicle's computer, to enable visibility of the command throughout the vehicle.

Figure 3:
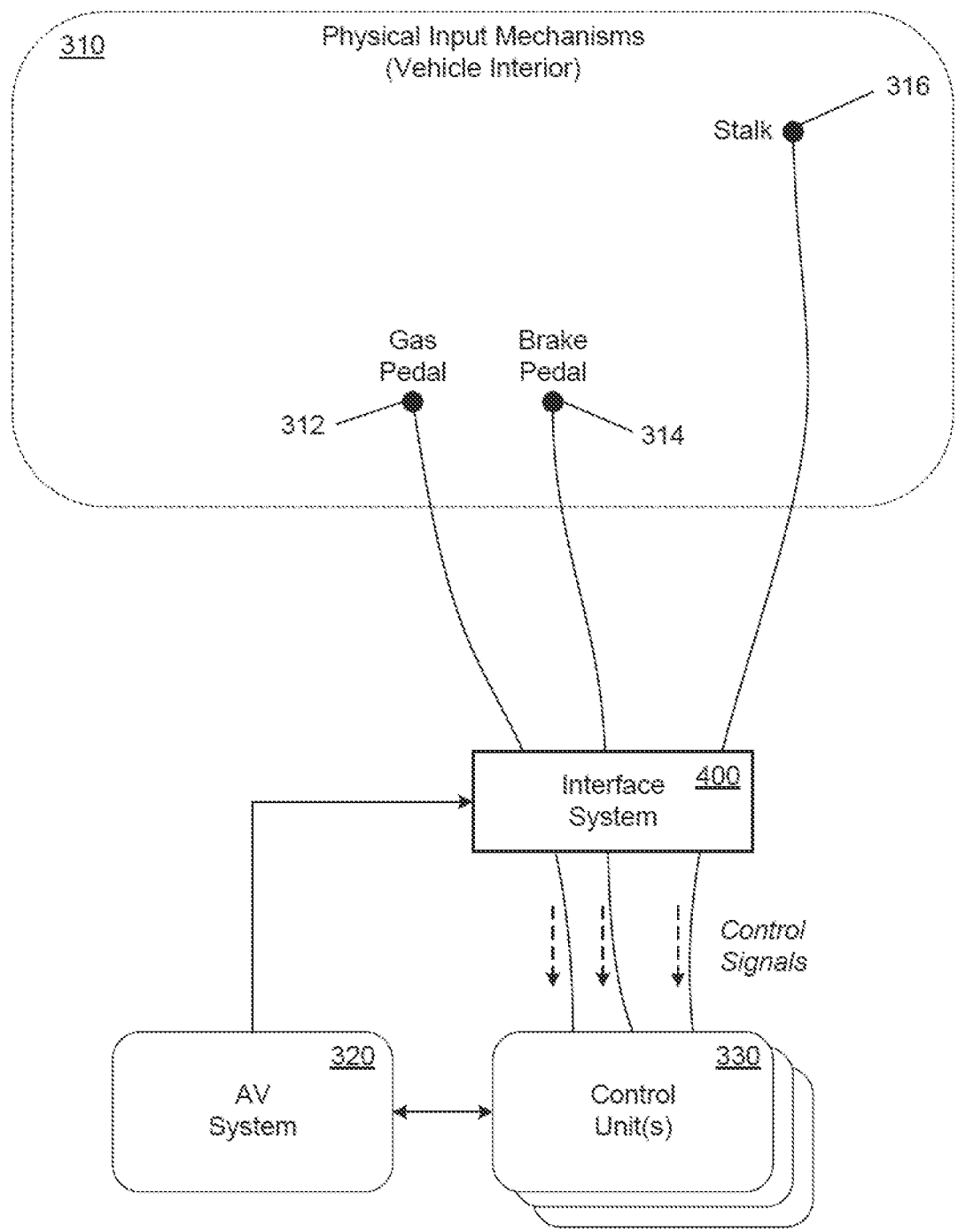
FIG. 3 is a diagram illustrating electrical connections between vehicle components and an interface system in accordance with an example embodiment.

FIG. 3 illustrates a diagram 300 of electrical connections between vehicle components and the system described herein in accordance with an example embodiment. Referring to FIG. 3, a vehicle may include physical input mechanisms within an interior 310 of the vehicle including a gas pedal 312, a brake pedal 314, and a stalk 316 which may be attached to a steering wheel (or underneath a steering wheel) and used to control headlights, turn signal indicators, cruise control, and the like. Each of the physical input mechanisms (e.g., the gas pedal 312, the brake pedal 314, the stalk 316, etc.) may be wired to one or more control units 330 of the vehicle, for example, an engine control unit, a transmission control unit, a CAN bus, and the like. Although not shown in FIG. 3, other physical input mechanisms may also be present such as buttons for hazard lights, cruise control, etc. that can each be controlled.

In the example of FIG. 3, an interface system 400 according to various embodiments is integrated into the vehicle. For example, the interface system 400 may be attached to or otherwise installed in connection the wiring between the physical input mechanisms and the control units 330. Here, the interface system 400 may include interfaces for receiving wire harnesses from each of the gas pedal 312, the brake pedal 314, and the stalk 316, as well as the sensors that are attached thereto. In this case, the interface system 400 may be used to block signals from the different physical input mechanisms (e.g., using relays, gates, switches, etc. inside the interface system 400), and generate control signals which appear as if they are coming from the physical input mechanisms (e.g., the gas pedal 312, the brake pedal 314, and the stalk 316).

The control signals may imitate or otherwise match the signals that would be sent from the physical input mechanisms. However, rather than require a user to press or otherwise interact with the physical input mechanisms, the control signals may be triggered by a command or a request from the vehicle's computer such as an AV system 320. The control signals may be received by the control units 330 and be processed as if they were coming from the actual physical input mechanisms. Thus, the vehicle's computer can control the physical input mechanisms (e.g., the gas pedal 312, the brake pedal 314, the stalk 316, etc.) as if a human were present in the interior 310 of the vehicle. Meanwhile, the control units 330 are unaware that the control signals are not from a human interacting with the physical input mechanisms.

Figure 4:
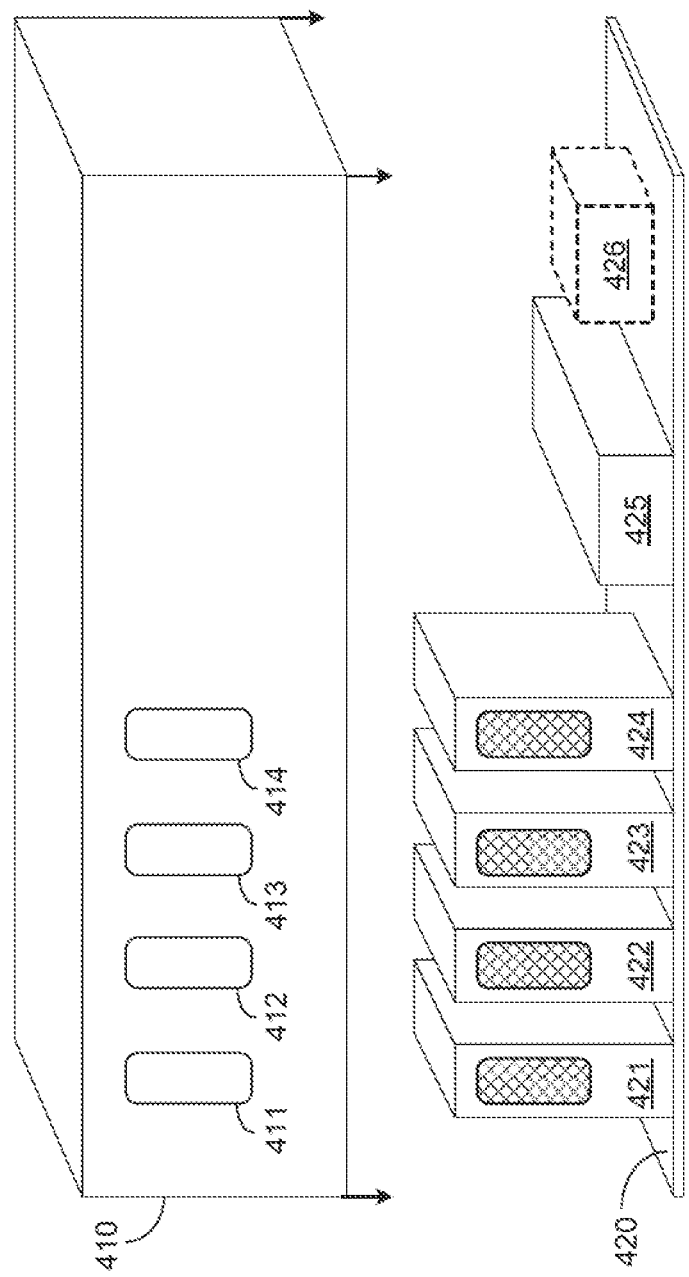
FIG. 4 is a diagram illustrating an example of the interface system shown in FIG. 3 in accordance with an example embodiment.

FIG. 4 illustrates an example of the interface system 400 shown in more detail in accordance with an example embodiment. Referring to FIG. 4, the interface system 400 may take the form of a box or other piece of equipment that has a slim design and can be placed under the hood or the console of a vehicle. Here, the interface system 400 includes a motherboard 420 with various components embedded therein. For example, the interface system 400 includes a plurality of interfaces 421, 422, 423, 424, etc. for connecting to wire harnesses of various physical input mechanisms of the vehicle. For example, the plurality of interfaces 421-424 may be mounting harnesses, input ports, and the like. One or more of the interfaces 421-424 may be used to connect to the vehicle's computer (e.g., the AV system, etc.) Also, while four interfaces 421-424 are shown, it should be appreciated that a different amount of interfaces may be embedded on the motherboard 420 as desired. The interface system 400 also includes a processing device 425 with logic embedded therein for translating requests from the vehicle's computer into control signals that are transmitted to the control units of the vehicle.

Furthermore, the interface system 400 may include a resistor module 426 that can easily be pulled out and replaced with a different resistor module. The resistor module 426 may include controls and protocols necessary for a particular OEM. By removing the resistor module 426 and replacing it with a different resistor module (not shown), the interface system 400 can be configured to work with a different type of OEM, having different types of controls and communication protocols.

The interface system 400 also includes a cover 410 which can be placed over and attached to the motherboard 420 to conceal the components of the interface system 400 inside the cover 410 essentially creating a housing for the internal components of the interface system 400. The cover 410 also includes a plurality of openings 411, 412, 413, 414, etc. that align with the plurality of interfaces 421, 422, 423, 424, respectively. Although not shown in FIG. 4, the interface system 400 may include other electrical components such as CPUs, network interfaces, etc. Also, the interface system 400 may have an audio/visual interface that connects to an internal audio/display of the vehicle enabling the interface system 400 to display system messages and audio warnings to a driver of the vehicle should one be present. For example, the interface system 400 may display a mode of the truck along with outputting audio warnings when the vehicle is having issues.

Figure 5B:
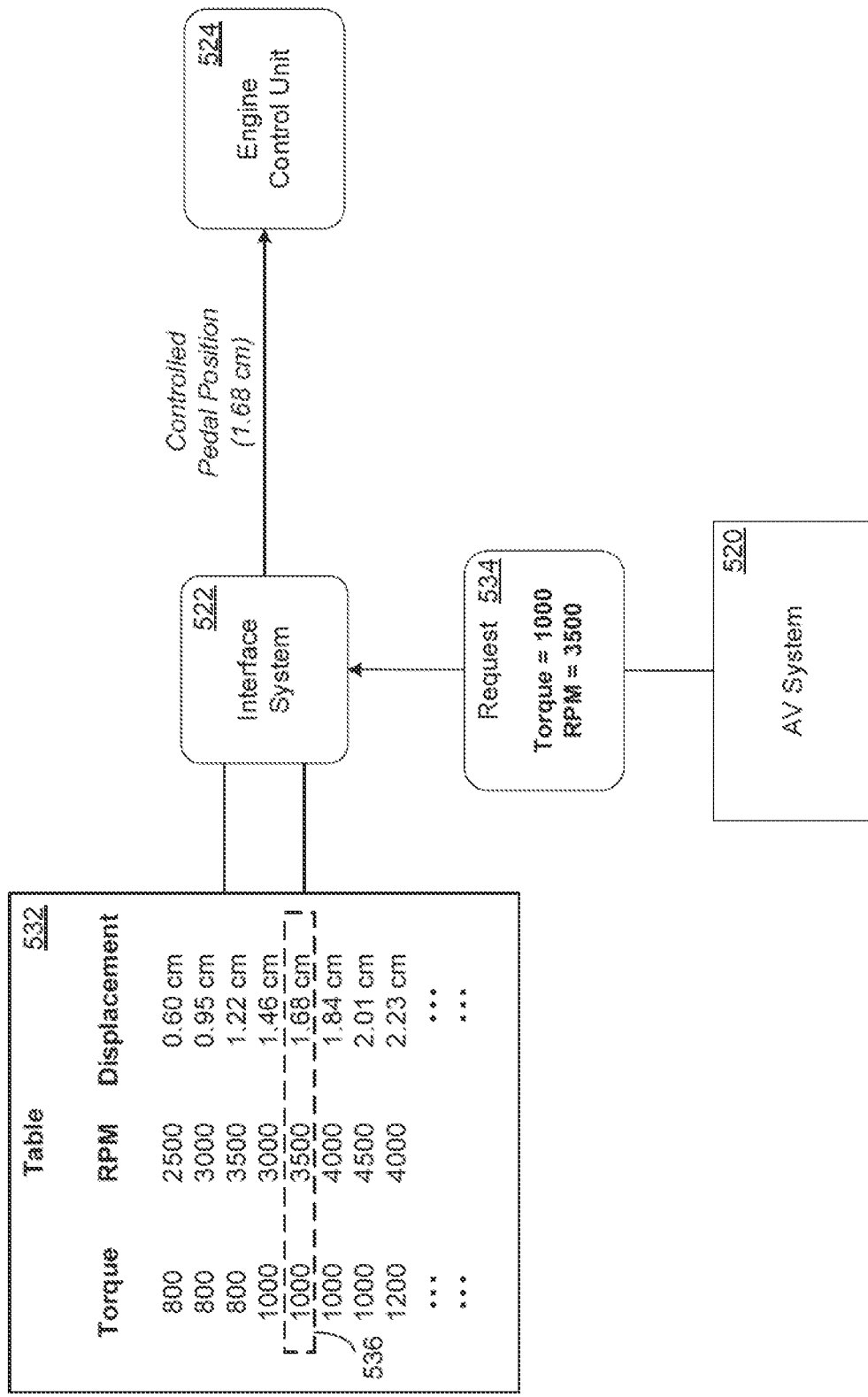

FIGS. 5A-5C illustrate processes for controlling a physical input on a component of a vehicle in accordance with an example embodiment. For example, FIG. 5A illustrates a process 500 of a control signal being generated to mimic or otherwise imitate a control signal from a gas pedal 510. Referring to FIG. 5A, an interface system 522 according to various embodiments is wired into an electrical connection between the gas pedal 510 and an engine control unit 524 and a transmission control unit 526. Here, the interface system 522 may use a relay or a switch inside of the interface system 522 to disable a connection between the gas pedal 510 and the engine control unit 524 and the transmission control unit 526. For example, the interface system 522 may receive a PWM signal from the gas pedal (or multiple PWM signals), and disable those PWM signals.

Meanwhile, the interface system 522 may establish a PWM signal (or PWM signals) between an AV system 520 and the engine control unit 524 and the transmission control unit 526. Here, the interface system 522 may receive a request or other command from the AV system 520 and generate a control signal which imitates a signal from the gas pedal 510 and transmit the control signal to the engine control unit 524 and/or the transmission control unit 526. When a user commands the gas pedal 510, the user may use their foot to press on the gas pedal 510 causing a change in pedal position from pedal position 511*a* to pedal position 511*b*. This change in pedal position can be sensed by one or more sensors (not shown) and transmitted to the engine control unit 524.

According to example embodiments, the interface system 522 may transmit a signal to the engine control unit 524 and/or the transmission control unit 526 which includes a change in pedal position value 512 of the gas pedal 510 even though the gas pedal 510 is not being stepped on by a user. For example, the pedal position value 512 may include a value that represents a measured displacement of the pedal (i.e., a change in position of the pedal). In other words, the signal from the interface system 522 may include the same content and the same type of values that would normally come from a control message from the gas pedal 510 and its sensor thereby appearing as if they came from the gas pedal 510. In response, the engine control unit 524 can use the pedal position value 512 to change the speed of the vehicle and the transmission control unit 526 can use the pedal position value to change gears. By using the pedal position value, the transmission control unit 526 can quickly find the correct gear in comparison to a tuning process that is performed without the pedal position value.

FIG. 5B illustrates a process 530 of the interface system 522 translating a request signal from the AV system 520 into a control signal with pedal position information. Referring to FIG. 5B, the AV system 520 may transmit a request 534 to the interface system 522 with an instruction to increase the speed of the vehicle. Here, the request 534 may include one or more values that the AV system 520 uses to trigger a change in speed of the vehicle. For example, the request 534 may include one or more of a desired torque value (e.g., torque=1000 lb-ft), a desired RPM value (e.g., RPM=3500), and the like. In this example, the interface system 522 has a lookup table 532 embedded therein which the interface system 522 refers to when the request 534 is received. Here, the interface system 522 can identify a mapping 536 of the torque value and the RPM value in the request 534 to a displacement value of the gas pedal 510 and transmit the displacement value (i.e., the change in position of the pedal) to the engine control unit 524 which also forwards the displacement value to the transmission control unit 526. If, however, an exact mapping does not exist, the interface 522 may interpolate a pedal position based on known mappings between torque, RPM, and pedal position stored in the lookup table 532.

FIG. 5C illustrates a process 540 of restoring the electrical connection (e.g., the circuit) between the gas pedal 510 and the engine control unit 524 and the transmission control unit 526. Here, the interface system 522 may receive a kill signal 542, also referred to herein as an estop signal, from the vehicle computer. In response, the interface system 522 may use a switch or relay to disable the connection from the AV system 520 to the engine control unit 524 and enable the connection from the gas pedal 510 to the engine control unit 524.

Figure 6:
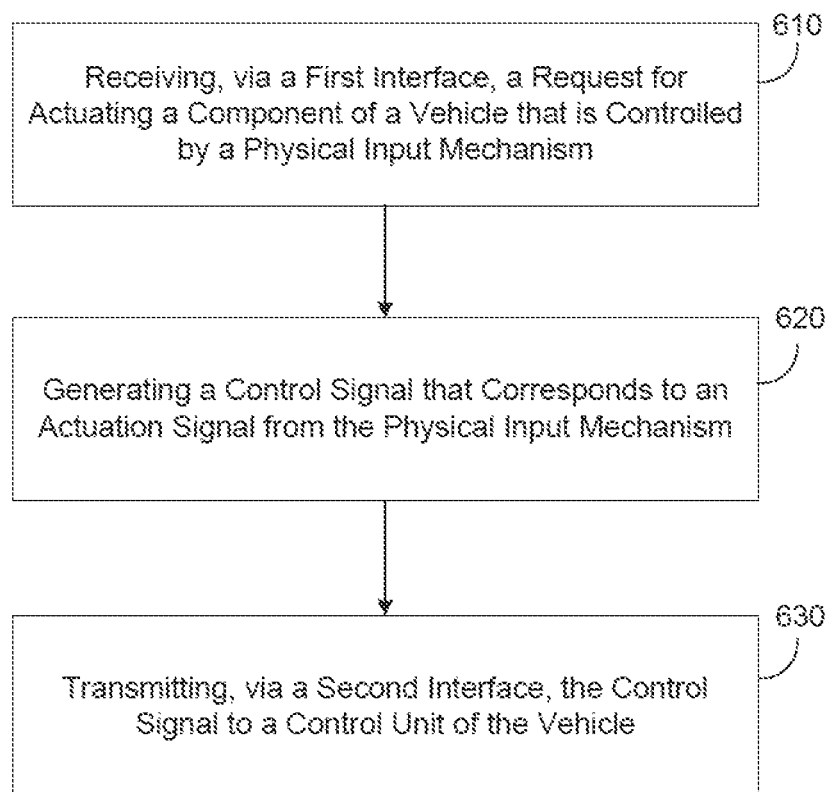
FIG. 6 is a diagram illustrating a method for controlling a physical input on a component of a vehicle in accordance with an example embodiment.

FIG. 6 illustrates a method 600 for controlling actuation of a physical input mechanism of a vehicle in accordance with an example embodiment. As an example, the method 600 may be performed by an apparatus described herein. Referring to FIG. 6, in 610, the method may include receiving, via a first interface, a request to actuate a component of a vehicle that is controlled by a physical input mechanism. In 620, the method may include generating, via a processor, a control signal that corresponds to (e.g., imitates, mimics, represents, appears like, etc.) an actuation signal from the physical input mechanism. In 630, the method may include transmitting, via a second interface, the generated control signal to a control unit of the vehicle for actuating the component of the vehicle.

In some embodiments, the receiving may include receiving the request from an autonomous vehicle (AV) system of the vehicle. In some embodiments, the component of the vehicle that is controlled by the physical input mechanism may include a gas pedal, and the generating comprises generating a control signal which imitates the gas pedal being pushed. In some embodiments, the request may include a torque value and an RPM value, and the generating comprises looking-up a corresponding pedal position value for the gas pedal that corresponds to the torque value and the RPM value, and transmitting the corresponding pedal position value to the control unit.

In some embodiments, the component of the vehicle that is controlled by the physical input mechanism may include a turn signal stalk, and the generating comprises generating a control signal which imitates one or more of a dial on the stalk being rotated, the stalk being moved up, and the stalk being moved down. In some embodiments, the component of the vehicle that is controlled by the physical input mechanism may include a brake pedal, and the generating comprises generating a control signal which imitates the brake pedal being pushed. In some embodiments, the transmitting may include transmitting the generated control signal to a controller area network (CAN) bus of the vehicle. In some embodiments, the method may further include receiving a stop signal from the vehicle, and in response, disabling the generated control signal and restoring a connection between the component and the physical input mechanism via a third interface.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. An apparatus comprising:
    an interface configured to receive a request to autonomously actuate a gas pedal of an autonomous vehicle from a computer of the autonomous vehicle; and
    a processor configured to
        translate one or more of a torque value and a revolutions per minute (RPM) value included in the received request into a pedal position displacement value of the gas pedal,
        generate an actuation signal which includes the translated pedal position displacement value of the gas pedal, and
        actuate a throttle of the autonomous vehicle based on the generated actuation signal.

2. The apparatus of claim 1, wherein the processor is configured to transmit the pedal position displacement value of the gas pedal to one or more of an engine control unit and a transmission control unit, to actuate the gas pedal.

3. The apparatus of claim 1, wherein the processor is configured to translate the one or more of the torque value and the RPM value into the pedal position displacement value based on a translation table that maps one or more of torque values and RPM values to pedal position displacement values.

4. The apparatus of claim 1, wherein the processor is further configured to transmit a pedal position displacement value of a brake pedal to one or more of an engine control unit and a transmission control unit of the vehicle, to actuate a braking system of the vehicle.

5. The apparatus of claim 1, wherein the interface is further configured to receive an additional request which comprises a request to actuate one or more of a turn signal stalk, a cruise control button, an air conditioning button, and a hazard lights button of the vehicle, and the processor is further configured to translate the additional request into a control signal for one or more of the turn signal stalk, the cruise control button, the air conditioning button, and the hazard lights button of the vehicle.

6. The apparatus of claim 5, wherein the processor is further configured to transmit the control signal to one or more of an engine control unit, a transmission control unit, and a CAN bus of the vehicle, to actuate the one or more of the turn signal stalk, the cruise control button, the air conditioning button, and the hazard lights button of the vehicle.

7. A method comprising:
    receiving a request to autonomously actuate a gas pedal of an autonomous vehicle from a computer of the autonomous vehicle;
    translating a value included in the received request into a pedal position displacement value of the gas pedal, wherein the translating comprises translating the value included in the received request into the output value based on a translation table that maps one or more of a torque value and an RPM value to a pedal position displacement value,
    generating an actuation signal which includes the translated pedal position displacement value of the gas pedal, and
    actuating a throttle of the autonomous vehicle based on the generated actuation signal.

8. The method of claim 7, wherein the request comprises a request to actuate a gas pedal of the vehicle, and the translating comprises translating one or more of a torque value and a revolutions per minute (RPM) value in the received request into a pedal position displacement value of the gas pedal.

9. The method of claim 8, wherein the actuating comprises transmitting the pedal position displacement value of the gas pedal to one or more of an engine control unit and a transmission control unit, to actuate the gas pedal.

10. The method of claim 7, wherein the actuating comprises transmitting a pedal position displacement value of a brake pedal to one or more of an engine control unit and a transmission control unit of the vehicle, to actuate a braking system of the vehicle.

11. The method of claim 7, wherein the method further comprises receiving an additional request to actuate one or more of a turn signal stalk, a cruise control button, an air conditioning button, and a hazard lights button of the vehicle, and the method further comprises translating the request into a control signal for one or more of the turn signal stalk, the cruise control button, the air conditioning button, and the hazard lights button of the vehicle.

12. The method of claim 11, wherein the method further comprises transmitting the control signal to one or more of an engine control unit, a transmission control unit, and a CAN bus of the vehicle, to actuate the one or more of the turn signal stalk, the cruise control button, the air conditioning button, and the hazard lights button of the vehicle.

13. A non-transitory computer-readable medium comprising instructions which when executed by a processor cause a computer to perform a method comprising:
    receiving a request to autonomously actuate a gas pedal of an autonomous vehicle from a computer of the autonomous vehicle;
    translating one or more of a torque value and a revolutions per minute (RPM) value included in the received request into a pedal position displacement value of the gas pedal,
    generating an actuation signal which includes the translated pedal position displacement value of the gas pedal, and
    actuating a throttle of the autonomous vehicle based on the generated actuation signal.

14. The computer-readable medium of claim 13, wherein the actuating comprises transmitting the pedal position displacement value of the gas pedal to one or more of an engine control unit and a transmission control unit, to actuate the gas pedal.

15. The computer-readable medium of claim 13, wherein the translating comprises translating the one or more of the torque value and the RPM value into the pedal position displacement value based on a translation table that maps one or more of torque values and RPM values to pedal position displacement values.

16. The computer-readable medium of claim 13, wherein the method comprises transmitting a pedal position displacement value of a brake pedal to one or more of an engine control unit and a transmission control unit of the vehicle, to actuate a braking system of the vehicle.

17. The computer-readable medium of claim 13, wherein the method further comprises receiving an additional request to actuate one or more of a turn signal stalk, a cruise control button, an air conditioning button, and a hazard lights button of the vehicle, and translating the additional request into a control signal for one or more of the turn signal stalk, the cruise control button, the air conditioning button, and the hazard lights button of the vehicle.

* * * * *